US012741394B2

(12) United States Patent
Okada

(10) Patent No.: US 12,741,394 B2
(45) Date of Patent: Sep. 22, 2026

(54) PUNCHING UNIT AND SHEET POST-PROCESSING DEVICE

(71) Applicant: KYOCERA Document Solutions Inc., Osaka (JP)

(72) Inventor: Rina Okada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 57 days.

(21) Appl. No.: 18/975,033

(22) Filed: Dec. 10, 2024

(65) Prior Publication Data

US 2025/0196386 A1 Jun. 19, 2025

(30) Foreign Application Priority Data

Dec. 18, 2023 (JP) ................................ 2023-212922

(51) Int. Cl.
*B26F 1/00* (2006.01)

(52) U.S. Cl.
CPC .................................. *B26F 1/0092* (2013.01)

(58) Field of Classification Search
CPC ..................................................... B26F 1/0092
See application file for complete search history.

(56) References Cited

U.S. PATENT DOCUMENTS

| | | | | |
|---|---|---|---|---|
| 5,839,336 A * | 11/1998 | Yamauchi | B26F 1/14 83/167 |
| 6,065,383 A | 5/2000 | Takaishi et al. | 83/368 |
| 7,131,363 B2 * | 11/2006 | Tseng | B26D 7/025 269/235 |
| 8,480,069 B2 * | 7/2013 | Shibasaki | B65H 45/18 270/58.08 |
| 9,579,815 B2 * | 2/2017 | Newell | B26D 5/28 |
| 11,952,233 B2 * | 4/2024 | Okada | B65H 35/10 |
| 2001/0049990 A1 | 12/2001 | Takaishi et al. | 83/628 |
| 2005/0039585 A1 * | 2/2005 | Battisti | B26F 1/02 83/13 |
| 2008/0066600 A1 * | 3/2008 | Mita | B26D 5/16 83/684 |
| 2010/0329755 A1 * | 12/2010 | Obuchi | B26F 1/14 399/361 |
| 2011/0197725 A1 * | 8/2011 | Nishimura | B26F 1/04 83/13 |

(Continued)

FOREIGN PATENT DOCUMENTS

| | | | |
|---|---|---|---|
| EP | 0665179 B1 * | 5/2000 | B26D 7/1854 |
| JP | H 09-249348 A | 9/1997 | |
| JP | 2017105641 A * | 6/2017 | |

*Primary Examiner* — Omar Flores Sanchez
(74) *Attorney, Agent, or Firm* — Stein IP, LLC

(57) ABSTRACT

A punching unit includes a punching blade, a holder, a biasing member, an eccentric cam, and a punching guide. The eccentric cam contacts the holder, and rotates against a biasing force of the biasing member to move the holder in a punching direction in which the punching blade approaches the sheet. The punching guide extends in a moving direction of the punching blade in which the punching blade moves with respect to the sheet, and guides movement of the punching blade. The eccentric cam, when moving the holder in the punching direction, passes by a side of the punching guide in a manner overlapping with the punching guide as seen from a rotation axis direction of the eccentric cam.

3 Claims, 8 Drawing Sheets

(56) References Cited

U.S. PATENT DOCUMENTS

| | | | | |
|---|---|---|---|---|
| 2012/0006173 | A1* | 1/2012 | Kiryu | B26F 1/24 83/628 |
| 2023/0137030 | A1* | 5/2023 | Okada | B26D 7/18 83/679 |

* cited by examiner

PUNCHING UNIT AND SHEET POST-PROCESSING DEVICE

INCORPORATION BY REFERENCE

This application is based on and claims the benefit of priority from Japanese Patent Application No. 2023-212922 filed on Dec. 18, 2023, the contents of which are hereby incorporated by reference.

BACKGROUND

The present disclosure relates to a punching unit that performs a punching process on a sheet, and a sheet post-processing device.

There have been known sheet post-processing devices that perform predetermined post-processing on a sheet after an image is formed on the sheet by an image forming apparatus such as a copier, a printer, or the like. Some sheet post-processing devices incorporate a punching unit that performs a punching process on a sheet to form a hole (punch hole) in the sheet.

SUMMARY

According to one aspect of the present disclosure, a punching unit includes a punching blade, a holder, a biasing member, an eccentric cam, and a punching guide. The punching blade forms a hole in a sheet. The holder holds the punching blade. The biasing member biases the holder in a retracting direction in which the punching blade moves away from the sheet. The eccentric cam contacts the holder, and rotates against a biasing force of the biasing member to move the holder in a punching direction in which the punching blade approaches the sheet. The punching guide extends in a moving direction of the punching blade in which the punching blade moves with respect to the sheet, and guides movement of the punching blade. The eccentric cam, when moving the holder in the punching direction, passes by a side of the punching guide in a manner overlapping with the punching guide as seen from a rotation axis direction of the eccentric cam.

DETAILED DESCRIPTION

Embodiments of the present disclosure will be described below with reference to the accompanying drawings. It should be understood, however, that the present disclosure is not limited to what is specifically described below.

Figure 1:
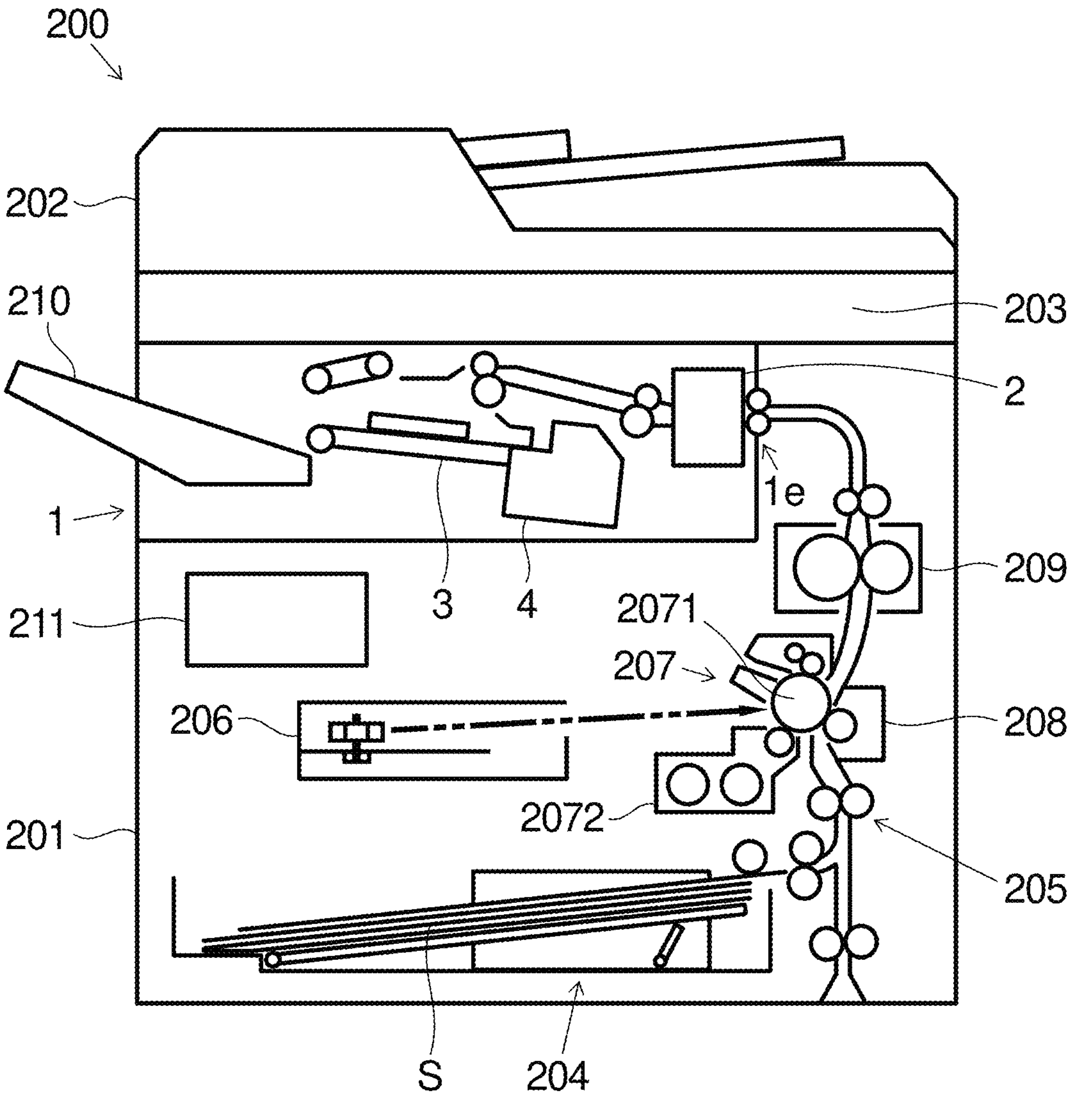
FIG. 1 is a schematic sectional front view of an image forming apparatus that includes a sheet post-processing device according to an embodiment of the present disclosure.

FIG. 1 is a schematic sectional front view of an image forming apparatus 200 that includes a sheet post-processing device 1 according to an embodiment of the present disclosure. The image forming apparatus 200 may be, for example, what is called a multifunction peripheral capable of monochrome printing, which is equipped with functions of printing, scanning (image reading), facsimile transmission and reception, etc. The image forming apparatus 200 may instead be an apparatus such as a copier, a printer, or the like, or may be an apparatus capable of color printing.

As shown in FIG. 1, the image forming apparatus 200 includes a document feeder 202 and an image reader 203. The document feeder 202 is placed on an upper surface of a main body of the image forming apparatus 200. The image reader 203 is disposed inside the main body 201 that is under the document feeder 202. An image of a document placed on the document feeder 202 or an image of a document placed on a contact glass (not shown) at an upper surface of the image reader 203 is read by the image reader 203.

The image forming apparatus 200 further includes, arranged inside the main body 201 thereof, a sheet feeding portion 204, a sheet conveying portion 205, an exposure portion 206, an image forming portion 207, a transfer portion 208, a fixing portion 209, the sheet post-processing device 1, a sheet discharging portion 210, and a controller 211.

The sheet feeding portion 204 is disposed in a bottom part of the main body 201. The sheet feeding portion 204 stores therein a plurality of sheets S that are unprinted and, during printing, feeds them out separately one by one. The sheet conveying portion 205 extends in an up-down direction along a side wall of the main body 201. The sheet conveying portion 205 conveys a sheet S fed out from the sheet feeding portion 204 to the transfer portion 208 and the fixing portion 209, and further discharges the sheet S having undergone fixing to the sheet post-processing device 1. The exposure portion 206 irradiates the image forming portion 207 with laser light that is controlled based on image data.

The image forming portion 207 is disposed above the sheet feeding portion 204. The image forming portion 207 includes a photosensitive drum 2071 and a development portion 2072. In the image forming portion 207, an electrostatic latent image of the document image is formed on an outer circumferential surface of the photosensitive drum 2071 by the laser light irradiated from the exposure portion 206. The development portion 2072 supplies toner to the electrostatic latent image formed on the outer circumferential surface of the photosensitive drum 2071 to develop the electrostatic latent image, and thereby forms a toner image. The transfer portion 208 transfers the toner image formed on the outer circumferential surface of the photosensitive drum 2071 onto the sheet S.

The fixing portion 209 is disposed above the transfer portion 208. The fixing portion 209 applies heat and pressure to the sheet S having the toner image transferred thereon, and thereby fixes the toner image on the sheet S.

The sheet post-processing device 1 is attachably/detachably fitted inside of the main body 201 of the image forming apparatus 200. The sheet S having the toner image fixed thereon at the fixing portion 209 is conveyed into the sheet post-processing device 1 through a sheet inlet port 1*e*. The sheet post-processing device 1 includes a punching unit 2, a processing tray 3, and a stapling unit 4.

The punching unit 2 is disposed downstream of the sheet inlet port 1*e* in a sheet conveyance direction. The punching unit 2 performs a punching process with respect to the sheet S conveyed thereto, and forms a hole (punch hole) in the sheet S. The processing tray 3 is disposed downstream of the punching unit 2 in the sheet conveyance direction. On the processing tray 3, a plurality of sheets S are stacked into a sheet bundle, with the sheets aligned. The stapling unit 4 is disposed upstream of the processing tray 3 in the sheet conveyance direction. The stapling unit 4 performs a stapling process (binding process) with respect to the sheet bundle stacked on the processing tray 3, and binds the sheet bundle.

The sheet discharging portion 210 is disposed on one side wall of the main body 201 opposite to a side wall adjacent to the sheet conveying portion 205 so as to be located downstream of the sheet post-processing device 1 in the sheet conveyance direction. The sheet S having passed through the sheet post-processing device 1 is conveyed to the sheet discharging portion 210 to be discharged onto a tray.

The controller 211 includes a CPU, a storage, an image processor, and other electronic circuits and parts (of which none is illustrated). The CPU controls operations of various components provided in the image forming apparatus 200 based on a control program and control data stored in the storage, and thereby performs processing related to functions of the image forming apparatus 200. The sheet feeding portion 204, the sheet conveying portion 205, the exposure portion 206, the image forming portion 207, the transfer portion 208, the fixing portion 209, and the sheet post-processing device 1 each individually receive a command from the controller 211, and cooperate with each other to perform printing with respect to the sheet S.

Note that, as to the control of the sheet post-processing device 1, the sheet post-processing device 1 itself may have the control function that the above-mentioned controller 211 has.

Figure 2:
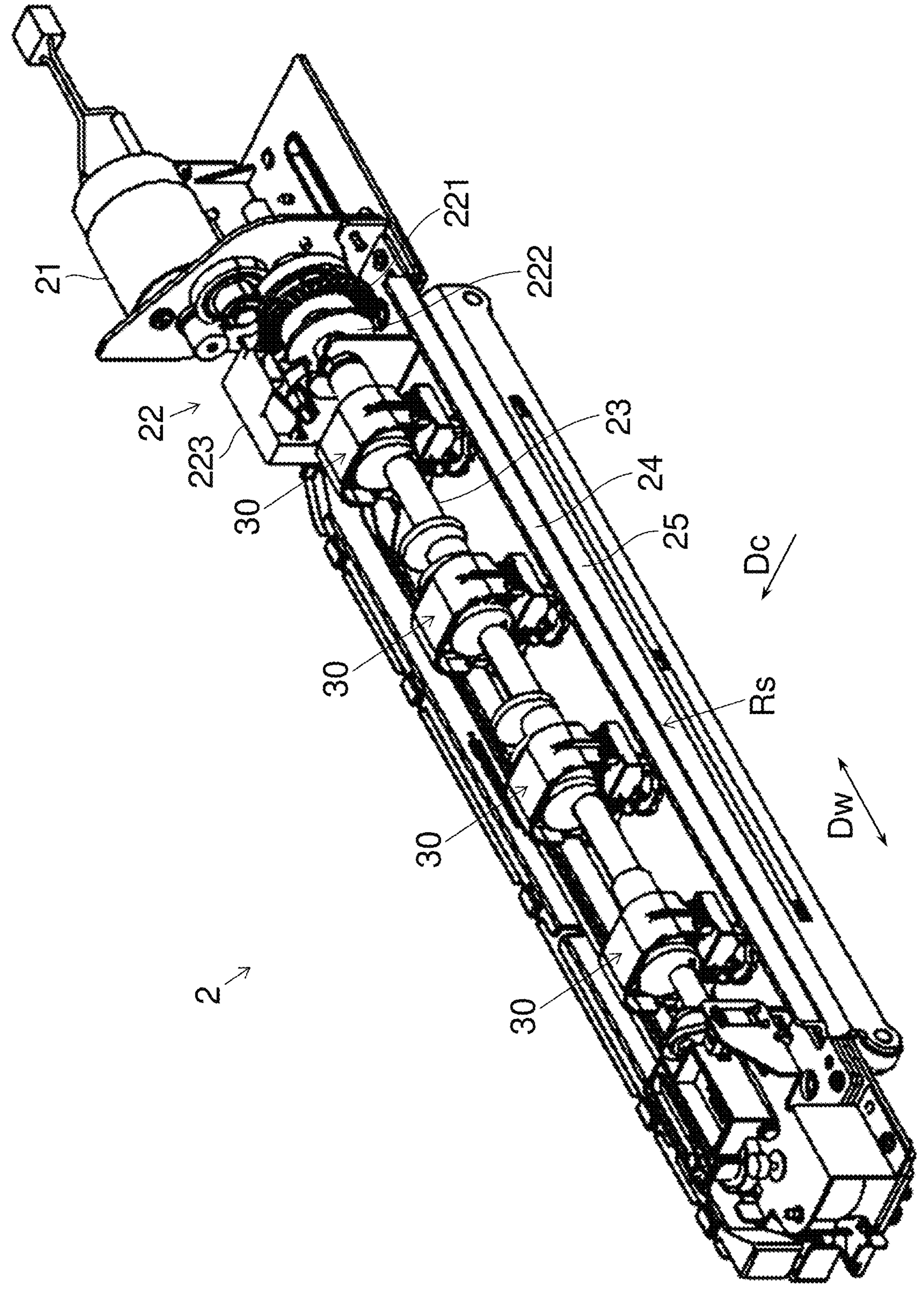
FIG. 2 is a perspective view of a punching unit incorporated in the sheet post-processing device shown in FIG. 1.

Next, a description will be given of a schematic configuration of the punching unit 2 of the sheet post-processing device 1 with reference to FIG. 2. FIG. 2 is a perspective view of the punching unit 2 of the sheet post-processing device 1 shown in FIG. 1. In the figures referenced below, the sheet conveyance direction Dc and a sheet width direction Dw, which is orthogonal to the sheet conveyance direction Dc, are depicted by arrows as necessary.

As shown in FIG. 2, the punching unit 2 includes a punching motor 21, a rotation detecting portion 22, a shaft 23, an upper guide member 24, a lower guide member 25, and a punching portion 30.

The punching motor 21 is disposed at one end part of the punching unit 2 in the sheet width direction Dw. The punching motor 21 is coupled to the shaft 23 via a gear, and rotates the shaft 23. As the punching motor 21, a DC brush motor can be used, for example.

The rotation detecting portion 22 is disposed adjacent to where the punching motor 21 and the shaft 23 are coupled to each other. The rotation detecting portion 22 detects rotation of the shaft 23. The rotation detecting portion 22 includes a first pulse plate 221, a second pulse plate 222, and a sensor portion 223.

The first pulse plate 221 and the second pulse plate 222, which are secured to the shaft 23, are each configured in a shape of a circular plate that rotates about an axis of the shaft 23 together with the shaft 23. The first pulse plate 221 has, in an outer circumferential part thereof, a plurality of slits formed to penetrate therethrough in the sheet width direction Dw and arranged at equal angular intervals in a circumferential direction thereof. The second pulse plate 222 has a single cut part formed therein to penetrate therethrough in the sheet width direction Dw so as to be disposed at a radially outer edge part thereof.

The sensor portion 223 includes a first sensor and a second sensor (of which neither is illustrated). The first sensor and the second sensor are transmissive optical sensors each having a light emitter and a light receiver. The first sensor and the second sensor are arranged such that the outer circumferential parts of the first pulse plate 221 and the second pulse plate 222, which are secured to the shaft 23, pass through optical paths of the first and second sensors. The controller 211 detects a rotation speed of the shaft 23 based on an output (pulse period) of the first sensor. The controller 211 detects, based on an output of the second sensor, that a rotation angle of the shaft 23 has become a reference angle (home position).

The shaft 23 extends across opposite end parts of the punching unit 2 in the sheet width direction Dw. The shaft 23, which is coupled to the punching motor 21 via the gear, receives power from the punching motor 21 to rotate about the axis extending in the sheet width direction Dw. The shaft 23 reciprocates a later-described punching blade 31 of the punching portion 30.

The upper guide member 24 and the lower guide member 25 are disposed below the shaft 23. The upper guide member 24 and the lower guide member 25 are each constituted of a plate-shaped member extending both in the sheet conveyance direction Dc and in the sheet width direction Dw. The upper guide member 24 and the lower guide member 25 are arranged opposite each other across a gap of a predetermined distance in the up-down direction. The gap between the upper guide member 24 and the lower guide member 25 constitutes a sheet conveying path Rs.

The punching portion 30 is disposed above the upper guide member 24. In the punching unit 2 of the present embodiment, the punching portion 30 includes four punching portions 30 arranged side by side along the shaft 23 at predetermined positions in the sheet width direction Dw. The punching portions 30 receive power from the shaft 23, which penetrates the punching portions 30 in the sheet width direction Dw, and perform the punching process with respect to the sheet S passing between the upper guide member 24 and the lower guide member 25 to form holes (punching holes) in the sheet.

Figure 3:
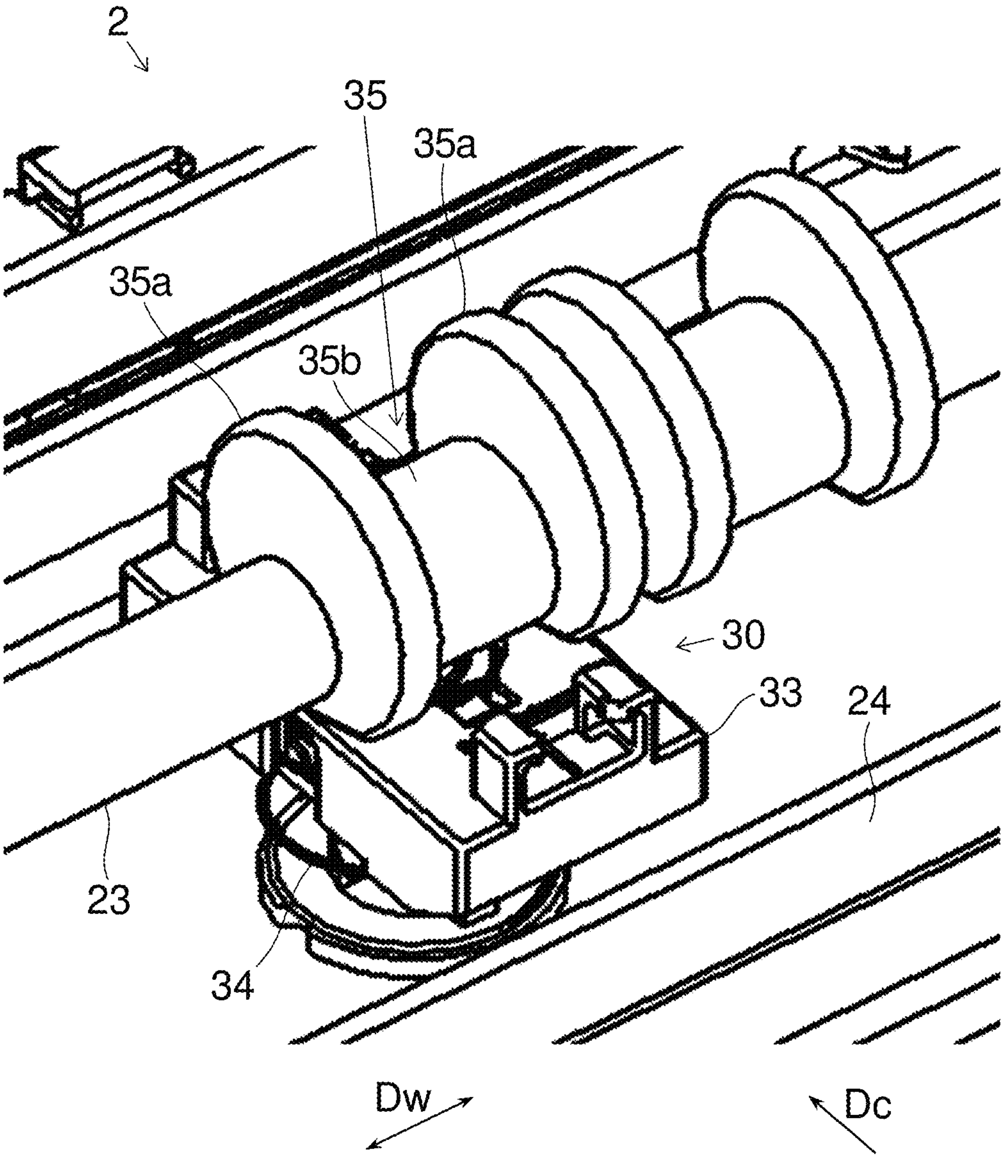
FIG. 3 is an enlarged partial perspective view of the punching unit shown in FIG. 2.
Figure 4:
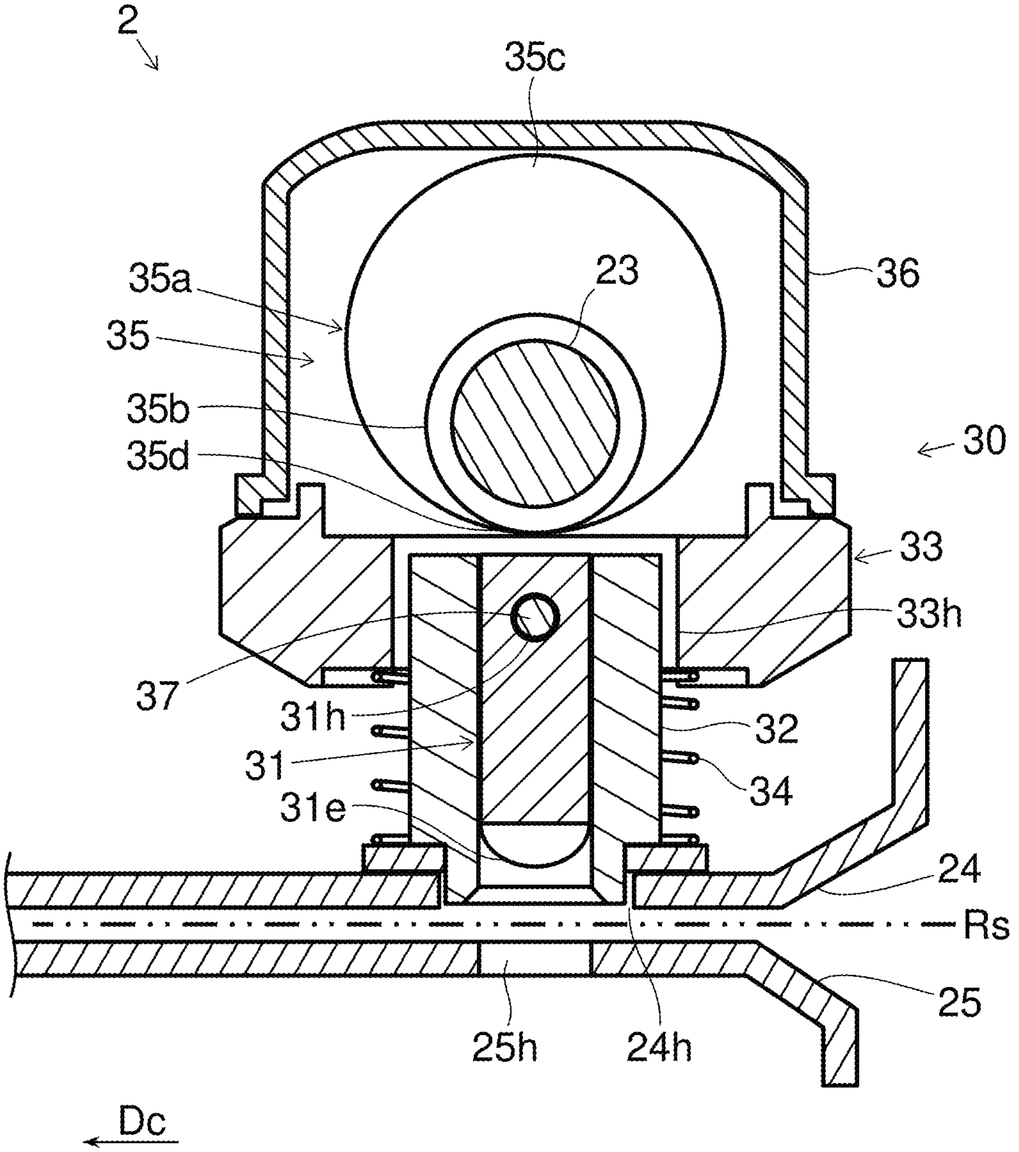
FIG. 4 is a vertical sectional front view of the punching unit shown in FIG. 2.
Figure 5:
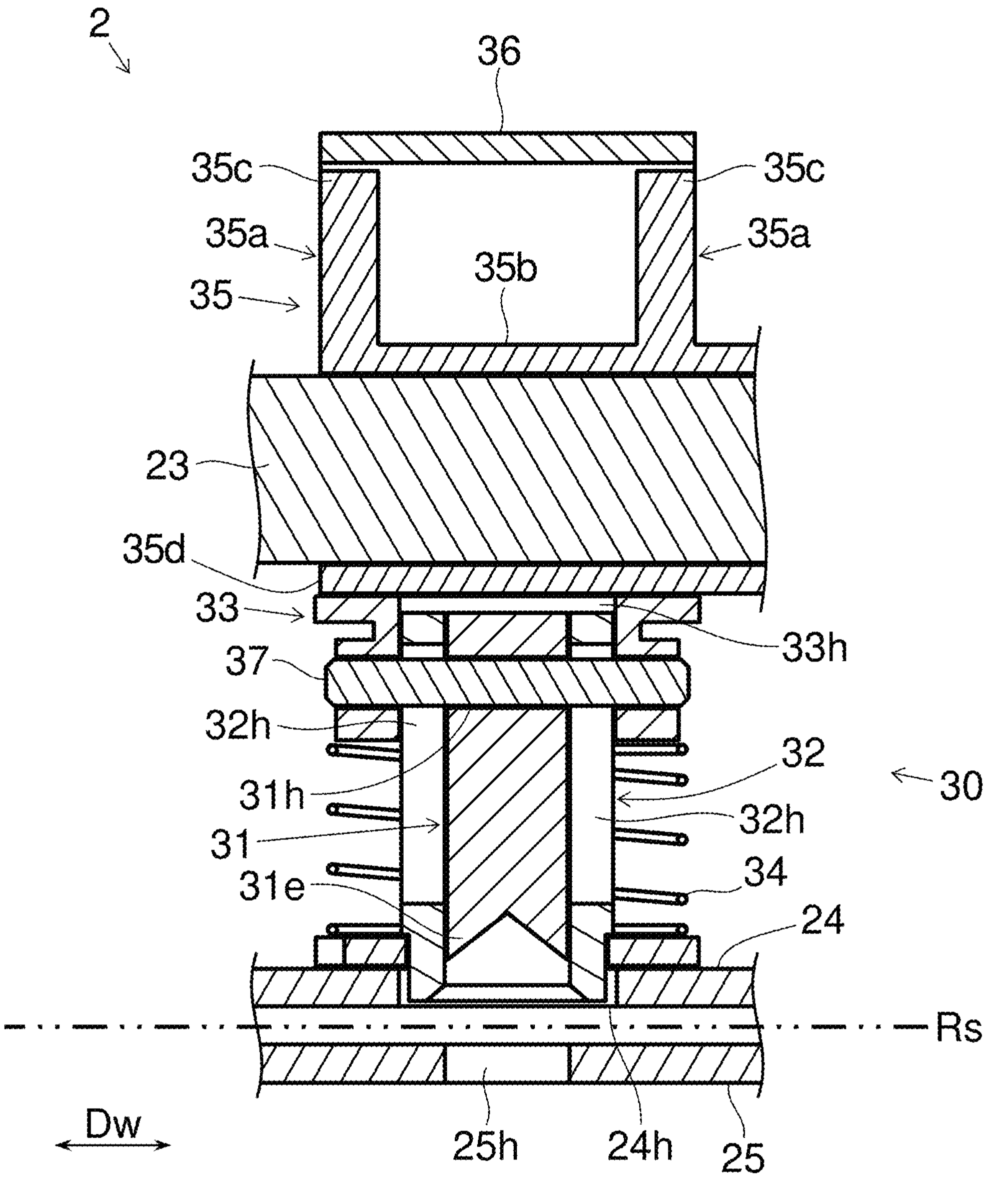
FIG. 5 is a vertical sectional side view of the punching unit shown in FIG. 2.
Figure 6:
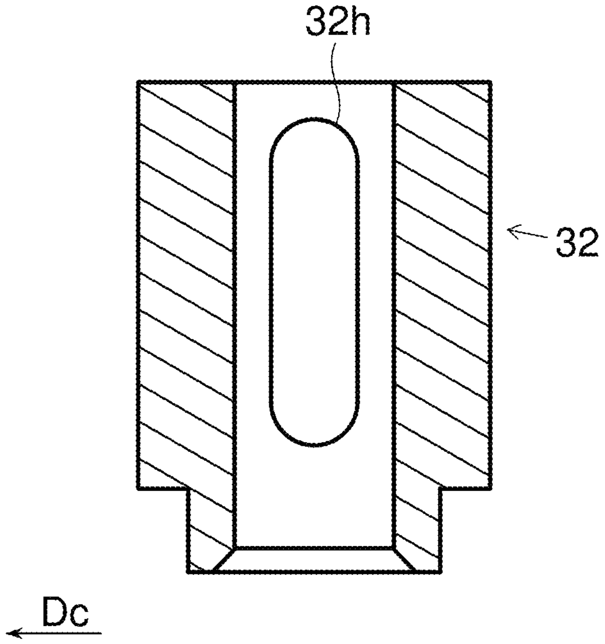
FIG. 6 is a vertical sectional front view of a punching guide of the punching unit shown in FIG. 2.
Figure 7:
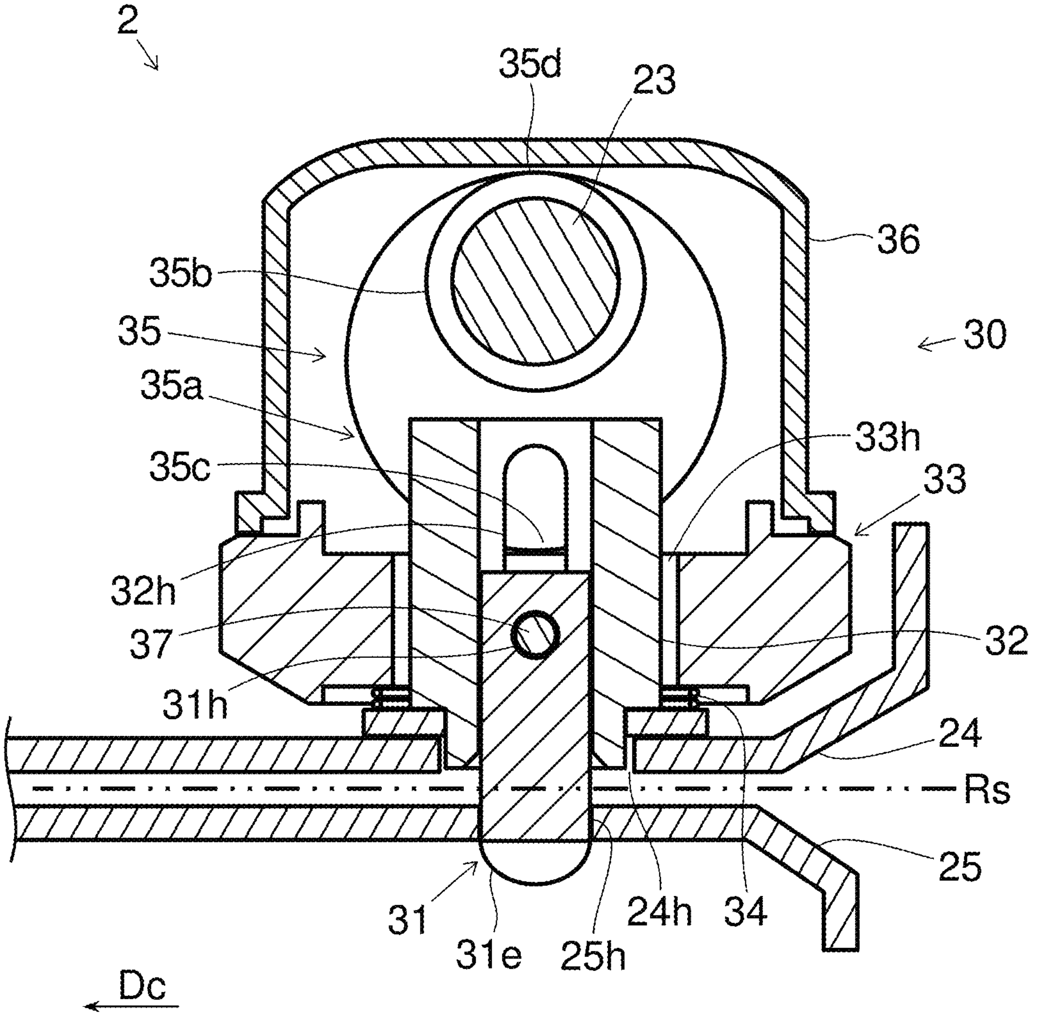
FIG. 7 is a vertical sectional front view showing a punching status of the punching unit shown in FIG. 2.
Figure 8:
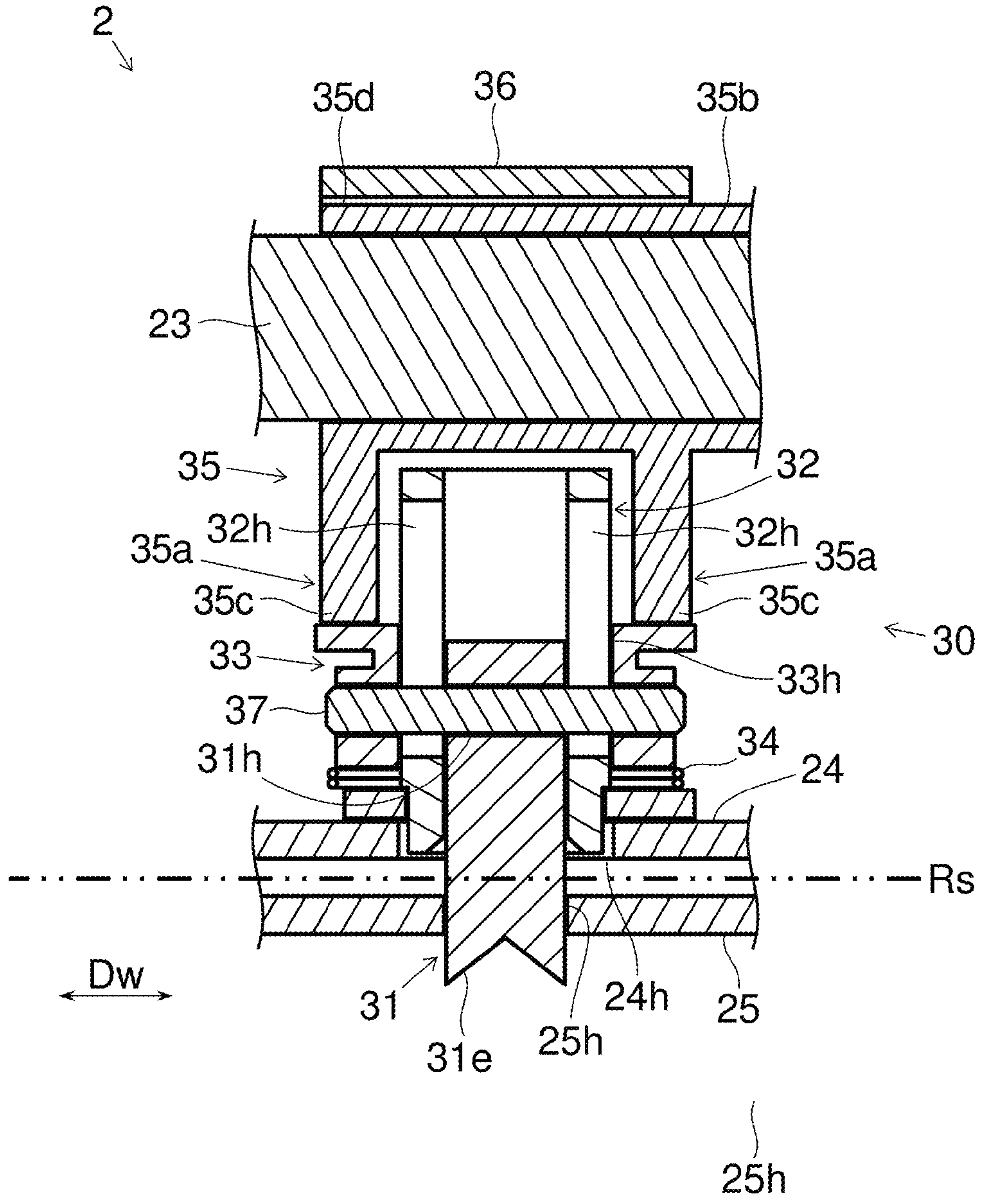
FIG. 8 is a vertical sectional side view showing the punching status of the punching unit shown in FIG. 2.

Next, the configuration of the punching portions 30 of the punching unit 2 will be described in more detail with reference to FIGS. 3 to 8, in addition to FIG. 2. FIGS. 3, 4, and 5 are respectively an enlarged partial perspective view, a vertical sectional front view, and a vertical sectional side view of the punching unit 2 shown in FIG. 2. FIG. 6 is a vertical sectional front view of a punching guide 32 of the punching unit 2 shown in FIG. 2. FIG. 7 and FIG. 8 are respectively a vertical sectional front view and a vertical sectional side view showing a punching status of the punching unit 2. Note that depiction of a cam cover 36 is omitted in FIG. 3.

As shown in FIG. 3, FIG. 4, and FIG. 5, each of the punching portions 30 includes the punching blade 31, the punching guide 32, a holder 33, a biasing member 34, an eccentric cam 35, a cam cover 36, and a connection pin 37.

The punching blade 31 is disposed above the upper guide member 24 but vertically below the shaft 23. The punching blade 31 is a member having a columnar or cylindrical shape extending (upward) in the direction of the normal of a surface of the sheet S conveyed along the sheet conveying path Rs between the upper guide member 24 and the lower guide member 25. In the present embodiment, the punching blade 31 is a metal pipe with a cutting edge 31*e* formed at a lower end part thereof. The punching blade 31 forms a hole in the sheet S conveyed along the sheet conveying path Rs.

The upper guide member 24 and the lower guide member 25 respectively have a through hole 24*h* and a through hole 25*h*. The through holes 24*h* and 25*h* are disposed at positions facing the punching blade 31 in the up-down direction. As shown in FIG. 7 and FIG. 8, the through holes 24*h* and 25*h* allow the punching blade 31 to pass therethrough when it moves in the up-down direction for punching and retracting with respect to the sheet S conveyed along the sheet conveying path Rs.

The punching guide 32 is secured to an upper side of the upper guide member 24. Further, the punching guide 32 is located below the shaft 23. The punching guide 32 is configured in a cylindrical shape extending in a moving direction of the punching blade 31 in which the punching blade 31 moves with respect to the sheet S, that is, the up-down direction. The punching blade 31 moves inside the punching guide 32 in the up-down direction. The punching guide 32 guides the movement of the punching blade 31.

The holder 33 is disposed at an upper part of the punching blade 31 so as to be radially outside the punching blade 31 and the punching guide 32, which are in cylindrical or columnar shape. The holder 33 has a hole 33*h* that is formed at a center thereof as seen from the up-down direction so as to penetrate the holder 33 in the up-down direction to allow the punching blade 31 and the punching guide 32 to pass therethrough. Further, the holder 33 is located below the shaft 23.

The holder 33 is connected via the connection pin 37 to the upper part of the punching blade 31. The holder 33 holds the punching blade 31. When the punching blade 31 moves in the up-down direction, the holder 33 moves in the up-down direction radially outside the punching guide 32.

The biasing member 34 disposed radially outside the punching guide 32 so as to be between the holder 33 and the upper guide member 24 in the up-down direction. The biasing member 34 is constituted of a compression coil spring, and inside a coil part thereof, the punching blade 31 and the punching guide 32 are located. The biasing member 34 biases the holder 33 upward with respect to the upper guide member 24. In other words, the biasing member 34 biases the holder 33 in a retracting direction in which the punching blade 31 moves away from the sheet S conveyed along the sheet conveying path Rs.

The eccentric cam 35 is disposed on an upper side of the holder 33. The eccentric cam 35 is secured to the shaft 23. The eccentric cam 35 includes a cam portion 35*a* and a shaft portion 35*b*.

The cam portion 35*a* contacts an upper surface of the holder 33 from above.

The cam portion 35*a* is formed in a shape of a circular plate that is circular as seen from an axis direction of the shaft 23 (the sheet width direction Dw). The holder 33 contacts an outer circumferential part of the cam portion 35*a*, which has the shape of a circular plate. The shaft portion 35*b* is disposed at a position that is off the center of the cam portion 35*a* which is circular, and is formed in a cylindrical shape extending along the axis direction of the shaft 23. The shaft 23 is inserted in the shaft portion 35*b*, and secured.

The eccentric cam 35 receives power from the punching motor 21, and rotates together with the shaft 23 about the axis of the shaft 23. At this time, the eccentric cam 35 contacts the holder 33, and rotates against the biasing force of the biasing member 34. Thereby, the eccentric cam 35 moves the holder 33 in a punching direction in which the punching blade 31 approaches the sheet S conveyed along the sheet conveying path Rs.

The cam cover 36 is fitted to an upper side of the holder 33, and covers the eccentric cam 35. The cam cover 36 is formed in an arc shape as seen from the axial direction of the shaft 23 (the sheet width direction Dw). A top end part of an inner circumference of the cam cover 36 is adjacent to the outer circumferential part of the cam portion 35*a*.

To pull up the punching blade 31 after the punching process is finished, the eccentric cam 35 rotates, with the outer circumferential part thereof sliding along an inner circumferential surface of the cam cover 36, such that a long-diameter part 35*c* thereof moves upward. That is, the cam cover 36 assists the movement of the eccentric cam 35 when the holder 33 (the punching blade 31) is pushed up by the biasing force of the biasing member 34.

As shown in FIG. 4 and FIG. 5, when the long-diameter part 35*c* of the eccentric cam 35 is located above the shaft 23, the holder 33 is biased due to effect of the biasing member 34 in the retracting direction (upward direction), in which the holder 33 moves away from the sheet S conveyed along the sheet conveying path Rs, and the punching blade 31 is located at a retraction position.

When the eccentric cam 35 rotates from the state shown in FIG. 4 and FIG. 5, the eccentric cam 35 rotates so as to push down the holder 33 against the biasing force of the biasing member 34. The eccentric cam 35 moves the holder 33 in the punching direction in which the punching blade 31 approaches the sheet S conveyed along the sheet conveying path Rs. The punching blade 31 contacts the sheet S, and is further pushed down to thereby form a hole in the sheet S.

Then, as shown in FIG. 7 and FIG. 8, when the long-diameter part 35*c* of the eccentric cam 35 reaches a lowermost position, the punching blade 31 is located at a punching completion position and the punching process with respect to the sheet S is completed.

As shown in FIG. 7 and FIG. 8, when moving the holder 33 in the punching direction, the eccentric cam 35 passes by a side of the punching guide 32 in a manner overlapping with the punching guide 32 as seen in a rotation axis direction of the eccentric cam 35 (the sheet width direction Dw). In other words, as shown in FIG. 8, as seen from the sheet width direction Dw, the cam portion 35*a* of the eccentric cam 35 is located outside the punching guide 32 in the sheet width direction Dw, and at this position, the cam portion 35*a* rotates about the axis of the eccentric cam 35.

According to the above configuration, the eccentric cam 35, during the period of its rotation, is not constantly located in a region that is on a side (upper side of the punching guide 32) opposite, across a region where the punching guide 32 is disposed, with respect to the punching position (position between the through holes 24*h* and 25*h*) at which punching is performed by a leading edge of the punching blade 31 with respect to the sheet S. This makes it possible to reduce a length of the punching unit 2 in the moving direction of the punching blade 31 (the up-down direction). In other words, it is possible to reduce height of the punching unit 2. Thus, it becomes possible to achieve compactness of punching unit 2.

As shown in FIG. 5, the connection pin 37 is fitted to the holder 33. In relation to this, the punching blade 31 has, in the upper part thereof, a connection hole 31*h* penetrating therethrough in the axial direction of the shaft 23 (the sheet width direction Dw). The connection pin 37 is inserted in the connection hole 31*h*, and connects the punching blade 31 and the holder 33. To be more specific, the connection pin

37 projects from the punching blade 31 on one and the other sides of the connection hole 31*h* with respect to the axis direction of the shaft 23 (the sheet width direction Dw) to be supported by the holder 33 at opposite end parts thereof.

As shown in FIG. 5 and FIG. 6, the punching guide 32 has an elongated hole 32*h*. The elongated hole 32*h* penetrates the punching guide 32, which is configured in a cylindrical shape, in the axis direction of the shaft 23 (the sheet width direction Dw), and a longitudinal direction of the elongated hole 32*h* extends in the moving direction of the punching blade 31 (the up-down direction). In the elongated hole 32*h*, the connection pin 37 is inserted.

Note that, as the elongated hole 32*h*, two elongated holes 32*h* are formed one at each of two positions facing each other in the axis direction of the shaft 23 (the sheet width direction Dw). More specifically, the connection pin 37 is inserted in the elongated holes 32*h* on one and the other sides of the punching blade 31 in the axis direction of the shaft 23 (the sheet width direction Dw).

According to the above configuration, it is possible to move the punching blade 31, which is disposed inside the punching guide 32 formed in a cylindrical shape, integrally with the holder 33. This makes it possible to easily reciprocate the punching blade 31 in the up-down direction, and thus to achieve a smooth punching process.

Furthermore, as shown in FIG. 3 and FIG. 5, the eccentric cam 35 includes two cam portions 35*a* as the cam portion 35*a*. The two cam portions 35*a* are formed in the same circular plate shape as seen from the axis direction of the shaft 23 (the sheet width direction Dw), and they are arranged parallel to each other with a space therebetween in the axis direction. The shaft portion 35*b* connects the two cam portions 35*a*.

The two cam portions 35*a* contact the holder 33 with corresponding parts of their outer circumferential ends when they rotate. For example, the two cam portions 35*a* both contact the holder 33 with their short-diameter parts 35*d* when the holder 33 is located at an uppermost position as shown in FIG. 4 and FIG. 5, and contact the holder 33 with their long-diameter parts 35*c* when the holder 33 is located at a lowermost position as shown in FIG. 7 and FIG. 8.

As shown in FIG. 5 and FIG. 8, the punching guide 32 is disposed so as to be located between the two cam portions 35*a* in the axis direction of the eccentric cam 35 (the sheet width direction Dw). When the holder 33 moves in the punching direction, the two cam portions 35*a* pass by the side of the punching guide 32 in a manner overlapping with the punching guide 32 as seen in the rotation axis direction of the eccentric cam 35 (the sheet width direction Dw).

According to the above configuration, on each of one and the other sides of the punching blade 31 in the axis direction of the shaft 23 (the sheet width direction Dw), power can be applied to the holder 33 to push down the holder 33. Thereby, it is possible to reciprocate the punching blade 31 in the up-down direction linearly along an extending direction of the punching guide 32. This makes it possible to suppress rattling of the punching blade 31 when moving, and thus to achieve a smooth punching process.

The above-described embodiment is by no means meant to limit the scope of the present disclosure, and various modifications can be made and implemented within the scope not departing from the gist of the present disclosure.

For example, in the above embodiment, the image forming apparatus 200 is described as an image forming apparatus for monochrome printing, but the image forming apparatus 200 is not limited to an image forming apparatus of that type. The image forming apparatus 200 may instead be an image forming apparatus for color printing, for example.

What is claimed is:

1. A punching unit, comprising:

a punching blade that forms a hole in a sheet;

a holder that holds the punching blade;

a biasing member that biases the holder in a retracting direction in which the punching blade moves away from the sheet;

an eccentric cam that contacts the holder, and that rotates against a biasing force of the biasing member to move the holder in a punching direction in which the punching blade approaches the sheet; and a punching guide that extends in a moving direction of the punching blade in which the punching blade moves with respect to the sheet, and that guides movement of the punching blade, wherein the eccentric cam, when moving the holder in the punching direction, passes by a side of the punching guide in a manner overlapping with the punching guide as seen from a rotation axis direction of the eccentric cam, the punching quide has an elongated hole that extends linearly in the moving direction of the punching blade, as the elongated hole, two elongated holes are formed one at each of two positions facing each other in the rotation axis direction with the punching blade therebetween, the punching unit includes a connection pin that connects the punching blade and the holder, and the connection pin is inserted in a connection hole formed in an upper part of the punching blade, the connection pin projects from the punching blade to be inserted in the elongated hole on one side and an other side of the connection hole with respect to the rotation axis direction, and the connection pin is supported by the holder at end parts thereof on the one side and the other side.

2. The punching unit according to claim 1, wherein the eccentric cam includes:

two cam portions that are identical in shape, that are arranged parallel to each other with a space therebetween in the rotation axis direction, and that contact the holder with corresponding parts of outer circumferential ends thereof when they rotate; and a shaft portion that connects the two cam portions, and the punching guide is disposed so as to be located between the two cam portions in the rotation axis direction.

3. A sheet post-processing device comprising the punching unit according to claim 1.

* * * * *